(12) United States Patent  
Schneider et al.

(10) Patent No.: US 9,063,593 B2  
(45) Date of Patent: Jun. 23, 2015

(54) DEVICE AND METHOD OF CONTROLLING A COMPUTER USING CENTROIDS

(75) Inventors: John K. Schneider, Snyder, NY (US); Jack C. Kitchens, Tonawanda, NY (US)

(73) Assignee: QUALCOMM Incorporated, San Diego, CA (US)

( * ) Notice: Subject to any disclaimer, the term of this patent is extended or adjusted under 35 U.S.C. 154(b) by 353 days.

(21) Appl. No.: 13/194,618

(22) Filed: Jul. 29, 2011

(65) Prior Publication Data

US 2012/0026117 A1 Feb. 2, 2012

Related U.S. Application Data

(60) Provisional application No. 61/368,865, filed on Jul. 29, 2010.

(51) Int. Cl.  
*G06F 3/041* (2006.01)

(52) U.S. Cl.  
CPC .................................. *G06F 3/041* (2013.01)

(58) Field of Classification Search  
USPC .......... 345/156, 166, 173, 175, 177; 382/124; 178/18.01–18.11  
See application file for complete search history.

(56) References Cited

U.S. PATENT DOCUMENTS

| | | | | |
|---|---|---|---|---|
| 5,479,528 A | * | 12/1995 | Speeter | 382/115 |
| 7,843,427 B2 | * | 11/2010 | Ording et al. | 345/157 |
| 7,916,126 B2 | * | 3/2011 | Westerman et al. | 345/173 |
| 2004/0131237 A1 | | 7/2004 | Machida | |
| 2004/0208348 A1 | | 10/2004 | Baharav et al. | |
| 2004/0252867 A1 | | 12/2004 | Lan et al. | |
| 2006/0192690 A1 | * | 8/2006 | Philipp | 341/33 |
| 2008/0309626 A1 | * | 12/2008 | Westerman et al. | 345/173 |
| 2009/0027351 A1 | * | 1/2009 | Zhang et al. | 345/173 |
| 2009/0051659 A1 | * | 2/2009 | Mickelborough | 345/173 |

OTHER PUBLICATIONS

International Search Report and Written Opinion - PCT/US2011/045976 - Isa/Epo - 2011-12-16.

* cited by examiner

*Primary Examiner* — Rodney Amadiz  
(74) *Attorney, Agent, or Firm* — Hodgson Russ LLP

(57) ABSTRACT

A computer control system and a method of controlling a computer are disclosed. One such system includes an area-array sensor and a processor. The processor may have a navigation mode, and when set to this mode, the processor is configured to execute certain tasks. Those tasks may include acquiring a first information set and acquiring a second information set from the sensor. The first information set may represent reflected energy received by the sensor at the first time and the second information set may represent reflected energy received by the sensor at the second time. The first information set indicates a first contact area corresponding to that portion of an indicator object (such as a finger or stylus) which contacts the platen at the first time, and the second information set indicates a second contact area corresponding to that portion of the indicator object which contacts the platen at the second time. Centroids of the contact areas are used to determine a navigation control measurement that may be used to control a computer.

30 Claims, 4 Drawing Sheets

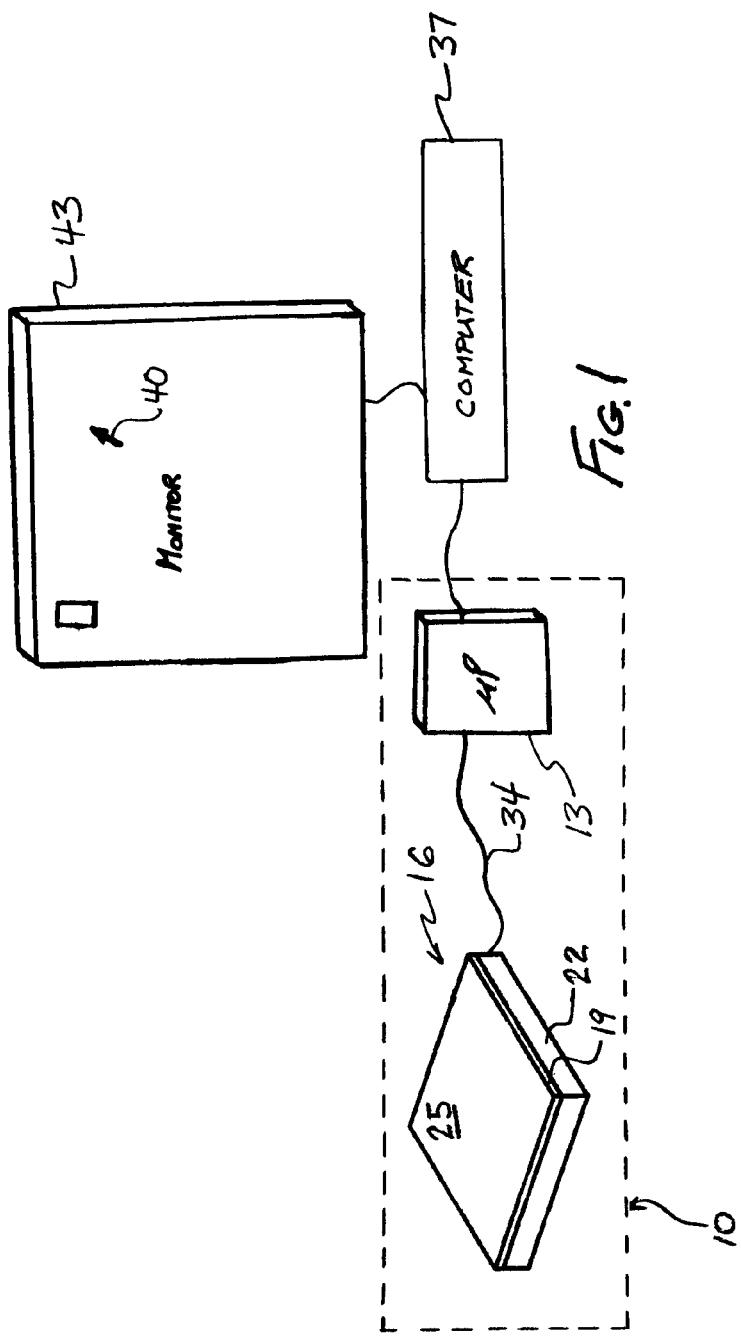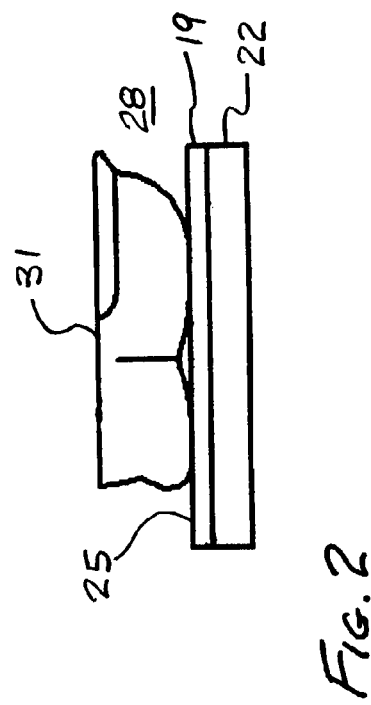

DEVICE AND METHOD OF CONTROLLING A COMPUTER USING CENTROIDS

CROSS-REFERENCE TO RELATED APPLICATION

This application claims the benefit of priority to U.S. provisional patent application Ser. No. 61/368,865, filed on Jul. 29, 2010.

FIELD OF THE INVENTION

The present invention relates to fingerprint sensors, and more specifically to large area fingerprint sensors, which are normally used for imaging multiple fingers simultaneously. Such sensors may use longitudinal wave energy such as ultrasound or electromagnetic wave energy such as light.

BACKGROUND OF THE INVENTION

Many consumer appliances have a navigation device, such as a mouse, touch pad or track ball, which can be used to control certain functions of the appliance. Some of these appliances also have a finger print scanner, which can be used to authorize use of the appliance. To make optimum use of the physical space that is available on some small consumer appliances that would benefit from having both a navigation device and a fingerprint sensor, it would be useful to assign the navigation function to the fingerprint sensor, and thereby consolidate the functionality into a single device.

SUMMARY OF THE INVENTION

The invention may be embodied as a computer control system. One such system includes an area-array sensor and a processor. The area-array sensor may have a platen and an energy detector, wherein the detector is configured to detect energy reflected from a surface of the platen. The processor is in communication with the area-array sensor. The processor may have a navigation mode, and when set to this mode, the processor is configured (for example, by programming the processor) to execute certain tasks. Those tasks may include acquiring a first information set and acquiring a second information set from the detector. The first information set may represent reflected energy received by the energy detector at the first time and the second information set may represent reflected energy received by the energy detector at the second time. The first information set indicates a first contact area corresponding to that portion of an indicator object (such as a finger or stylus) which contacts the platen at the first time, and the second information set indicates a second contact area corresponding to that portion of the indicator object which contacts the platen at the second time.

The first information set may be used to determine a first centroid location, the first centroid location being the first contact area's centroid. The second information set may be used to determine a second centroid location, the second centroid location being the second contact area's centroid. The first centroid location is compared to the second centroid location, and a difference is identified. The difference between the first centroid location and the second centroid location may be used to calculate a navigation control measurement. The navigation control measurement may be used, for example, to control a cursor displayed on a monitor.

The navigation control measurement may be a distance between the first centroid location and the second centroid location. Or, for example, the navigation control measurement may be a direction from the first centroid location to the second centroid location.

The navigation control measurement may be a velocity. The velocity may be determined by calculating the distance between the first centroid location and the second centroid location, and dividing that difference by a time difference, the time difference being elapsed time between acquiring the first information set and acquiring the second information set.

The energy detected by the sensor may be a longitudinal wave, such as an ultra-sound wave, that has been reflected from an interface, one side of which is a surface of the platen. Other types of sensors, such as an electromagnetic wave (e.g. light) sensor may be used.

The system may include a mode-switch for selecting between an surface-description mode and the navigation mode. In the surface-description mode, the reflected energy received at the energy detector processes signals received by the detector according to a set of instructions designed to produce a description of the object that contacts the platen. For example, the surface-description data may describe the surface of the indicator object that contacts the platen. The mode-switch may be a mechanical switch, or the mode-switch may be a software switch which is set by the processor in response to a user input request.

The invention may be implemented as a method. In one such method, a change in a state of a computer system is effected. To do so, an area-array sensor (such as that described above) may be provided. A processor in communication with the area-array sensor is provided. The processor may be configured to acquire a first information set at a first time, and a second information set at a second time. The first information set may represent reflected energy detected by the energy detector at the first time, and the second information set may represent reflected energy detected by the energy detector at the second time. Each information set may indicate a contact area at their corresponding times, the contact area being that portion of the indicator object that contacts the platen.

The processor may use the first information set to determine a first centroid location, and may use the second information set to determine a second centroid location. The first centroid location is the location of the first contact area's centroid, and the second centroid location is the location of the second contact area's centroid.

The first centroid location may be compared by the processor to the second centroid location, and a difference between the first centroid location and the second centroid location may be identified. Using that difference, the processor may calculate a navigating control measurement, which may be used to effect a change in a state of a computer system. The change in state may be a change to a cursor that is displayed on a monitor of the computer system.

The change in state may be a position change to an object displayed on a monitor of the computer system, and in that situation the control measurement may be a distance between the first centroid location and the second centroid location. In such a situation, the distance may be correlated to the position change.

The change in state may be a velocity of an object displayed on a monitor of the computer system. In that situation, the control measurement may be a velocity, which may be calculated by determining the distance between the first centroid location and the second centroid location, and dividing that difference by a time difference, which may be the elapsed time between acquiring the first information set and acquiring the second information set.

The change in state may be a movement direction of an object displayed on a monitor of the computer system. In that situation, the control measurement may be a centroid movement direction, the centroid movement direction being a direction from the first centroid location to the second centroid location. The object movement direction may be correlated to the centroid movement direction.

The invention need not be limited to situations in which the change in state of the computer is limited to movement of a cursor. For example, the change in state may be a change in a computer control variable, such as an audio volume level, a brightness level, or a change in a graphical user interface. Or, the change in state may include selecting an application provided by a computer, closing an application provided by a computer, or interrupting a routine being executed by the computer.

BRIEF DESCRIPTION OF THE DRAWINGS

For a fuller understanding of the nature and objects of the invention, reference should be made to the accompanying drawings and the subsequent description. Briefly, the drawings are:

FIG. 1 is a schematic of a system that is in keeping with the invention;

FIG. 2 depicts a finger on an area-array sensor;

FURTHER DESCRIPTION OF THE INVENTION

Figure 3:
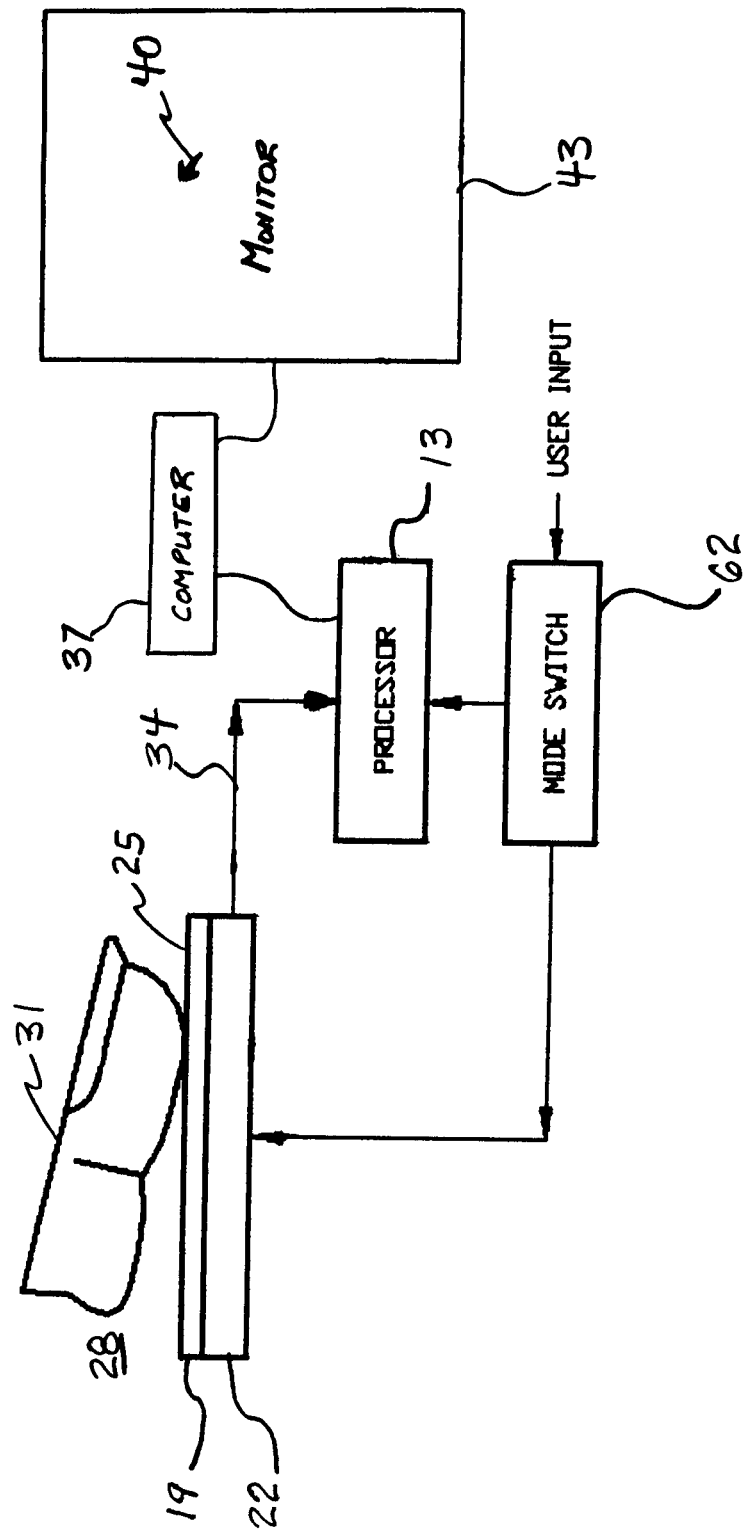
FIG. 3 is a schematic of a system that is in keeping with the invention.

The invention may be embodied as a computer control system 10. FIGS. 1-3 depict aspects of one such system. The control system 10 includes a processor 13 and an area-array sensor 16. The area-array sensor 16 includes a platen 19 and an energy detector 22. The energy detector 22 may provide a plurality of locations where energy can be detected. The detector 22 is configured to detect energy reflected at an interface of a surface 25 of the platen 19.

For example, when the energy detector 22 uses ultrasound, a piezoelectric transducer may be used to send a longitudinal wave, often in the form of a pulse, through an acoustic transmitting media. The pulse then partially reflects back at each media interface. Depending on the materials of the interface, more or less ultrasonic energy may be reflected. For example, an interface that is comprised of a polycarbonate platen 19 and air 28 will reflect more energy than will an interface that is comprised of a polycarbonate platen 19 and skin.

The pulse reflected back to the detector 22 may be used to measure the exact distance traveled by the pulse going to and returning from each reflecting material interface. A time interval is monitored whereby valid signals can be received using a process called range gating (biasing). So, if a particular interface is of interest, it is possible to identify energy reflected from that interface by knowing a range of time during which the energy from that interface is expected to arrive at the detector 22. Energy which arrives at other times can be discarded.

Reflected energy which arrives at the energy detector 22 during the desired time interval is then processed. If the detector 22 includes a plurality of detector locations, each detector location can provide information about a particular portion of the interface that reflected the energy. For example, energy detected at each of the detector locations can be converted to a digital value representing the signal strength for that location. If the digital values are correlated to a particular color (e.g. shades of gray), the digital values may be displayed graphically to provide information about the interface. For example, if the interface is a surface of a platen on which a finger may be placed, the color-form of the digital values creates a three-dimensional contour map of the finger that is in contact with the platen surface. In that situation, the depth of any gap structure (fingerprint valleys) detail may be displayed as a gray-scale bitmap image.

The energy detector 22 may detect a longitudinal wave that has been reflected by an indicator object 31, such as a finger or stylus, that resides on the platen 19. For example, an ultra-sonic energy wave may be directed toward the platen 19, and at least some of the ultra-sound may be reflected at the interface between the platen 19 and the indicator object 31. The reflected ultra-sound may travel to and be detected by the energy detector 22. Alternatively, the energy detector 22 may detect an electromagnetic wave, such as light.

The energy detector 22 may be in communication with the processor 13 via a communication channel 34. The communication channel 34 may be a conductive wire or a wireless communication system having a transmitter and a receiver. The processor 13 may be configured to operate in a navigation mode so that reflected energy received by the energy detector 22 is interpreted as a desire to control a computer 37 in some fashion. For example, a user may intend that movement of his finger across the platen 19 should be interpreted as a desire to move a cursor 40 being displayed on a monitor 43.

Figure 4A:
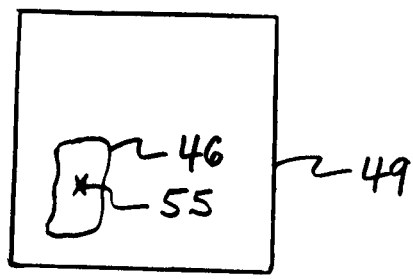
FIG. 4A is a schematic of a scanning area at a first time.

In this mode, the processor 13 may be configured to accomplish certain tasks. For example, the processor 13 may acquire a first information set from the sensor at a first time. The first information set represents reflected energy received by the energy detector 22. For example, the first information set may be digital values corresponding to the signal strength of the reflected energy received at the detector locations of the energy detector 22. The first information set indicates a first contact area 46 corresponding to that portion of the indicator object 31 which contacts the platen 19 at the first time. FIG. 4A depicts a scanning area 49 of the energy detector 22 at the first time. The scanning area 49 may be slightly smaller than the platen 19.

Figure 4B:
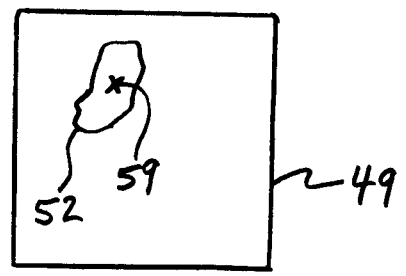
FIG. 4B is a schematic of the scanning area at a second time.

At a second time, later than the first, a second information set is acquired from the sensor by the processor 13. The second information set represents reflected energy received by the energy detector 22. The second information set indicates a second contact area 52 corresponding to that portion of the indicator object 31 which contacts the platen 19 at the second time. FIG. 4B depicts the scanning area 49 of the energy detector 22 at the second time.

The processor 13 uses the first information set to determine a first centroid location 55. The first centroid location 55 is located at the first contact area's 46 centroid. The processor 13 also uses the second information set to determine a second centroid location 59, the second centroid location 59 being located at the second contact area's 52 centroid. A number of procedures are available for determining a centroid, but one which works well is referred to by the U.S. Federal Bureau Of Investigation as "R92".

The processor 13 compares the first centroid location 55 to the second centroid location 59, and identifies a difference between the first centroid location 55 and the second centroid location 59. The difference in centroid locations 55, 59 indicates how the indicator object 31 moved between the first and second times. Using the difference in centroid locations 55, 59, the processor calculates a navigation control measurement.

The navigation control measurement may be used to control a cursor 40 displayed on a monitor 43. For example, the processor 13 may determine the distance from the first centroid location 55 to the second centroid location 59 between the first time and the second time. That distance may be communicated to a computer 37. The computer 37 may use the distance determined by the processor 13 to move a cursor 40 that is displayed on a monitor 43. The distance moved by the cursor 40 need not be identical to the distance determined by the processor 13. In most instances, the distance moved by the cursor 40 will be more than the distance determined by the processor 13 when the monitor 43 is larger than the platen 19. In this manner, the indicator object 31 may be used to move the cursor 40 a desired distance.

The navigation control measurement may be a velocity. For example, the processor 13 may determine the distance between the first and second centroid locations 55, 59, and also determine the time elapsed between the first and second times. The velocity may be determined by dividing the determined distance by the determined elapsed time. That determined velocity may be used by the computer 37 to move a cursor 40 that is displayed on a monitor 43. In this manner, the cursor 40 on the monitor 43 may be made to move at a velocity corresponding to the velocity of the indicator object 31. For example, the velocity of the cursor 40 may be greater than the velocity of the indicator object 31, particularly when the monitor 43 is larger than the platen 19.

The navigation control measurement may be a direction. For example, the processor 13 may determine the direction from the first centroid location 55 to the second centroid location 59. That determined direction may be used by the processor 13 and the computer 37 to move a cursor 40 that is displayed on a monitor 43 in a direction that corresponds to the direction in which the indicator object's 31 centroid was determined to move. To illustrate, when the determined direction is coupled with a distance, the cursor 40 on the monitor may be made to move from a first location on the monitor to a second location on the monitor 43. Furthermore, when the determined direction and distance are coupled with a velocity, the cursor 40 may be made to move from one location to another location on the monitor 43 in a manner that mimics the motion of the indicator object 31 on the platen 19.

Having outlined how the system might operate in the navigation mode, it should be emphasized that other modes of operation may be implemented using the computer control system 10. The computer control system 10 may include a mode-switch 62, which may be used to select between the navigation mode, an example of which is described above, and a surface-description mode. In the surface-description mode, the processor 13 is configured to accomplish certain tasks related to generating data that describes the surface of an object 31 that contacts the platen 19. In the surface-description mode, the tasks executed by the processor 13 assume that a description of the surface (such as an image) is ultimately desired. As such, the reflected energy detected by the energy detector is ultimately transformed into data that can be used to display an image of the object surface, or evaluate a surface of the object 31 that is in contact with the platen 19. For example, in the surface-description mode, the data produced by the processor 13 may be used by the computer 37 to display a gray-scale image of the object's surface or the data may be used to compare the object's surface to data sets in a database in order to determine whether the object 31 matches any of the data sets in the database. It should be noted that the word "matches" does not necessarily require identicalness—substantial similarity may be sufficient. By providing multiple modes of operation, the computer control system 10 can be used to serve multiple purposes, for example, by providing (1) a navigation control measurement, and (2) information which can be used to identify the indicator object 31 (such as a finger) that is resting on the platen 19. When these two modes of operation are provided, the same platen 19 may be utilized to authorize a user to use the computer 37 by matching biometric data, such as data obtained from a fingerprint, provided by the user to data sets in a database, and then accepting navigation commands from that (now authorized) user in order to control the computer 37 and cause the computer 37 to behave in a manner desired by the user. The mode-switch 62 may be a mechanical switch, which can be physically moved by a user of the system 10, or the mode-switch 62 may be coded into the software and set by the processor 13 in response to a user input request.

By using a single platen 19 to provide surface-description data for finger recognition and also to provide navigation data for controlling a pointer icon (or other computer function), the cost of implementing these functions into an electronic device is reduced. Also, a typical laptop navigation device (often a touchpad) occupies a significant area on the laptop's surface, and by utilizing a single platen 19 of a fingerprint sensor to provide both (1) the information normally provided by a stand-alone touchpad, and (2) the information normally provided by a stand-alone fingerprint sensor, that same space provides more functionality.

Figure 5:
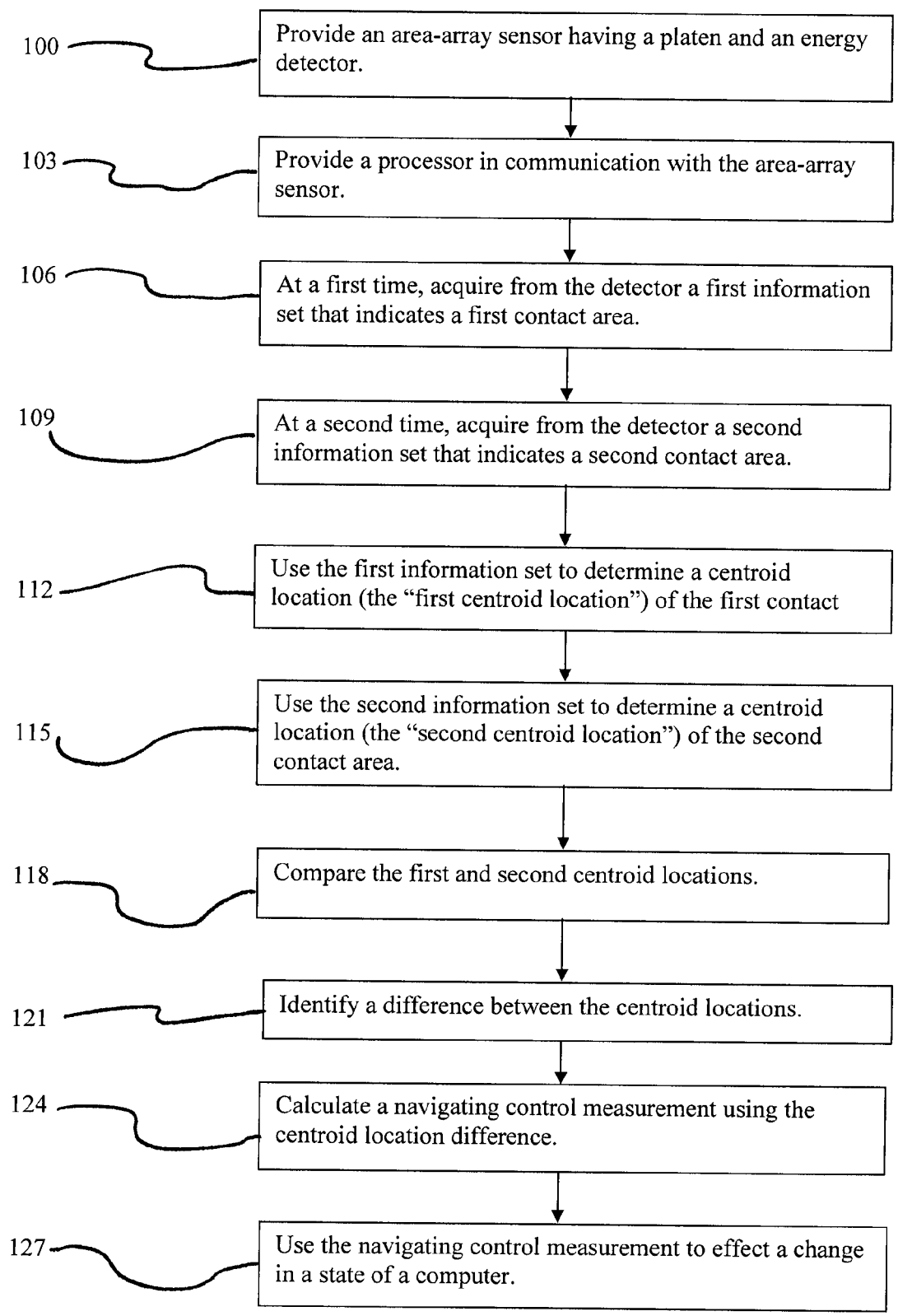
FIG. 5 is a flowchart describing a method that is in keeping with the invention.

The invention may be embodied as a method of effecting a change in the state of a computer system. FIG. 5 depicts one such method. In that method, an area-array sensor may be provided 100 and a processor may be provided 103. The area-array sensor may have a platen and an energy detector. The detector may be configured to detect energy reflected from an interface between a platen and substances that contact the platen. For example, a longitudinal energy wave (e.g. ultra-sound) or an electromagnetic energy wave (e.g. light) may be directed at the platen, and the energy from the wave that is reflected from the platen is detected by the energy detector.

The processor is in communication with the area-array sensor in order that signals from the detector may be communicated to the processor. The communicated signals indicate to the processor those locations on the platen that reflected energy that was detected by the energy detector.

At a first time, a first information set is acquired 106 from the sensor by the processor. The first information set may represent those locations on the platen that reflected energy that was detected by the energy detector. The first information set may indicate the locations on the platen where energy was reflected, and may indicate the strength of the reflected signal at each of those locations. Since an object on the platen often results in an area where energy is not reflected from the platen, by negative implication the first information set indicates where the object resides on the platen. As such, the first information set indicates a first contact area corresponding to that portion of the indicator object which contacts the platen at the first time.

At a second time, a second information set is acquired 109 from the detector by the processor. The second information set represents those locations on the platen that reflected energy that was detected by the energy detector. The second indicator set may indicate the locations on the platen where energy was reflected, and may indicate the strength of the reflected signal at each of those locations. Since an object on the platen results in an area where energy is not reflected from the platen, by negative implication the second information set indicates where the object resides on the platen. As such, the second information set indicates a second contact area corresponding to that portion of the indicator object which contacts the platen at the second time.

The first information set may be used 112 to determine a first centroid location. The first centroid location is the first contact area's centroid. The second information set may be used 115 to determine a second centroid location. The second centroid location is the second contact area's centroid. The first centroid location is compared 118 to the second centroid location, and a difference between the first centroid location and the second centroid location is identified 121. Using the difference, a navigating control measurement is calculated 124. The navigating control measurement may be used 127 to effect a change in a state of a computer system. For example, the change in state may be a change to a cursor displayed on a monitor of the computer system.

To illustrate the idea, the change in state may be a position change to an object displayed on a monitor of the computer system, and the corresponding control measurement is a distance between the first centroid location and the second centroid location. The distance between the first and second centroid locations may be correlated to the position change so that the object on the monitor moves in a manner that is related to the change in centroid locations. In this manner, the object may be made to move in a manner that is similar to movement of the indicator object on the platen.

The change in state may be a velocity of an object displayed on a monitor of the computer system. In that situation, the corresponding control measurement is a velocity. The velocity may be the distance between the first centroid location and the second centroid location divided by a time difference, the time difference being elapsed time between acquiring the first information set and acquiring the second information set.

The change in state may be a movement direction of an object that is displayed on a monitor of the computer system. In that situation, the corresponding control measurement is a centroid movement direction. The centroid movement direction is the direction from the first centroid location to the second centroid location. In order to determine the centroid movement direction, the processor may determine Cartesian coordinates for the first centroid location and Cartesian coordinates for the second centroid location. By comparing the change in x-coordinates and comparing the change in y-coordinates, the processor can determine the direction of movement. By using the direction change, an object that is displayed on the monitor may be made to change directions in a manner that is similar to the change in direction of the indicator object that is on the platen.

The change in state may be a change in a computer control variable, such as an audio volume level, or a brightness level. Further, the change in state may be a change in a graphical user interface that is displayed to a user via a monitor. Or, the change in state may include selecting an application that is provided by a computer, or closing an application that is provided by a computer, or interrupting a routine being executed by the computer.

It will now be recognized that the invention described herein may be implemented to use a fingerprint sensor not only for its traditional role in authorizing use of the appliance, but also for navigational purposes. For example, such a fingerprint sensor may be used for controlling a pointer icon, and in this manner the fingerprint sensor may be used in lieu of a touch pad, track ball, mouse, or other navigation device. The area of the sensor that is in contact with a finger can be characterized, a centroidal position may be determined at two instances of time, and the motion of the centroidal position (and therefore the motion of the finger) may be determined from this information. It will be recognized that this may be accomplished without capturing the information necessary to constitute a fingerprint. The motion of the centroidal position may be used to control a pointer icon displayed on a monitor. Such a method/apparatus may be used with a personal computer, cell phone, personal digital assistant or other device requiring an interactive navigation device.

Although the present invention has been described with respect to one or more particular embodiments, it will be understood that other embodiments of the present invention may be made without departing from the spirit and scope of the present invention. Hence, the present invention is deemed limited only by the appended claims and the reasonable interpretation thereof.

What is claimed is:

1. A computer control system, comprising:
    an area-array sensor having a platen and an energy detector, wherein the sensor is configured to detect energy reflected from a surface of the platen;
    a processor in communication with the area-array sensor, wherein the processor is configured in a navigation mode to:
    (a) at a first time, acquire a first information set from the energy detector, the first information set representing reflected energy received by the energy detector, the first information set describing a first contact area of an indicator object, the first contact area being in contact with the platen at the first time;
    (b) at a second time, acquire a second information set from the energy detector, the second information set representing reflected energy received by the energy detector, the second information set describing a second contact area of the indicator object, the second contact area being in contact with the platen at the second time;
    (c) use the first information set to determine a first centroid location, the first centroid location being the first contact area's centroid location;
    (d) use the second information set to determine a second centroid location, the second centroid location being the second contact area's centroid location;
    (e) compare the first centroid location to the second centroid location;
    (f) identify a difference between the first centroid location and the second centroid location; and
    (g) calculate a navigation control measurement using the difference.

2. The system of claim 1, wherein the navigation control measurement is used to control a cursor displayed on a monitor.

3. The system of claim 1, wherein the navigation control measurement is a distance between the first centroid location and the second centroid location.

4. The system of claim 1, wherein the navigation control measurement is a velocity, the velocity being a distance between the first centroid location and the second centroid location divided by a time difference, the time difference being elapsed time between acquiring the first information set and acquiring the second information set.

5. The system of claim 1, wherein the navigation control measurement is a direction from the first centroid location to the second centroid location.

6. The system of claim 1, wherein the area-array sensor detects a longitudinal wave that has been reflected.

7. The system of claim 6, wherein the longitudinal wave is ultra-sound.

8. The system of claim 1, wherein the area-array sensor detects an electromagnetic wave that has been reflected.

9. The system of claim 8, wherein the electromagnetic wave is light.

10. The system of claim 1, further comprising a mode-switch for selecting between a surface-description mode and the navigation mode, wherein the processor is configured in the surface-description mode to receive information about a finger on the platen, and process the received information as surface-description data.

11. The system of claim 10, wherein the mode-switch is a mechanical switch.

12. The system of claim 10, wherein the mode-switch is a software switch which is set by the processor in response to a user input request.

13. The system of claim 1, wherein the indicator object is a finger.

14. A method of effecting a change in a state of a computer system, comprising:
  providing an area-array sensor having a platen and an energy detector, wherein the detector is configured to detect energy reflected from a surface of the platen;
  providing a processor in communication with the area-array sensor;
  at a first time, acquiring a first information set from the energy detector, the first information set representing reflected energy detected by the energy detector, the first information set describing a first contact area of the indicator object, the first contact area being in contact with the platen at the first time;
  at a second time, acquiring a second information set from the energy detector, the second information set representing reflected energy received by the energy detector, the second information set describing a second contact area of the indicator object, the second contact area being in contact with the platen at the second time;
  using the first information set to determine a first centroid location, the first centroid location being the first contact area's centroid location;
  using the second information set to determine a second centroid location, the second centroid location being the second contact area's centroid location;
  comparing the first centroid location to the second centroid location;
  identifying a difference between the first centroid location and the second centroid location;
  calculating a navigating control measurement using the difference; and
  using the navigating control measurement to effect a change in a state of a computer system.

15. The method of claim 14, wherein the change in state is a change to a cursor displayed on a monitor of the computer system.

16. The method of claim 14, wherein the change in state is a position change to an object displayed on a monitor of the computer system, and the control measurement is a distance between the first centroid location and the second centroid location, and the distance is correlated to the position change.

17. The method of claim 14, wherein the change in state is a velocity of an object displayed on a monitor of the computer system, and the control measurement is a velocity, the velocity being a distance between the first centroid location and the second centroid location divided by a time difference, the time difference being elapsed time between acquiring the first information set and acquiring the second information set.

18. The method of claim 14, wherein the change in state is a movement direction of an object displayed on a monitor of the computer system, and the control measurement is a centroid movement direction, the centroid movement direction being a direction from the first centroid location to the second centroid location, and the object movement direction is correlated to the centroid movement direction.

19. The method of claim 14, wherein the change in state is a change in a computer control variable.

20. The method of claim 19, wherein the control variable is an audio volume level.

21. The method of claim 19, wherein the control variable is a brightness level.

22. The method of claim 14, wherein the change in state is a change in a graphical user interface.

23. The method of claim 14, wherein the change in state includes selecting an application provided by the computer system.

24. The method of claim 14, wherein the change in state includes closing an application provided by the computer system.

25. The method of claim 14, wherein the change in state includes interrupting a routine being executed by the computer system.

26. The method of claim 14, wherein the area-array sensor detects a longitudinal wave that has been reflected.

27. The method of claim 26, wherein the longitudinal wave is ultra-sound.

28. The method of claim 14, wherein the area-array sensor detects an electromagnetic wave that has been reflected.

29. The method of claim 28, wherein the electromagnetic wave is light.

30. The method of claim 14, further comprising selecting between a surface-description mode and a navigation mode using a mode-switch, wherein the processor is configured in the surface-description mode to receive information about a finger on the platen, and process the received information as surface-description data.

* * * * *